United States Patent [19]
Simpson

[11] 3,869,784
[45] Mar. 11, 1975

[54] TOOL FOR ALIGNING ARTICLES

[76] Inventor: Richard R. Simpson, 2817 Oak Cove, West Memphis, Ark. 72301

[22] Filed: Oct. 3, 1973

[21] Appl. No.: 402,986

[52] U.S. Cl. ............................................. 29/272
[51] Int. Cl. ........................................... B25b 5/14
[58] Field of Search ......... 228/4, 44; 29/200 P, 272, 29/271; 269/49, 246, 189

[56] References Cited
UNITED STATES PATENTS

| 2,328,271 | 8/1943 | Green et al. | 29/271 |
| 2,376,957 | 5/1945 | Buckley | 29/271 |

FOREIGN PATENTS OR APPLICATIONS

| 1,166,311 | 11/1958 | France | 269/49 |

*Primary Examiner*—Al Lawrence Smith
*Assistant Examiner*—Harold P. Smith, Jr.
*Attorney, Agent, or Firm*—Clarence A. O'Brien; Harvey B. Jacobson

[57] ABSTRACT

An elongated shank is provided and has one end telescoped through an abutment sleeve having a diametric slot at one end. The end of the shank corresponding to the slotted end of the abutment sleeve has a transverse blade thereon slidingly received in the slot of the sleeve and the slotted end of the sleeve includes a transverse abutment member disposed substantially normal to the slot and extending there across. The blade has a slot formed therein extending longitudinally of the shank and through which the transverse abutment member carried by the slotted end of the sleeve is slidingly received. In addition, the opposite sides of the free end edge of the blade which projects outwardly of the slot in the sleeve are provided with abutment members which oppose the opposite ends of the transverse abutment member carried by the sleeve. The end of the shank remote from the blade and the corresponding end of the sleeve include structure for developing an axial thrust on the shank to shift the latter in a direction moving the abutment members on the opposite sides of the blade toward the transverse abutment member carried by the slotted end of the sleeve.

8 Claims, 5 Drawing Figures

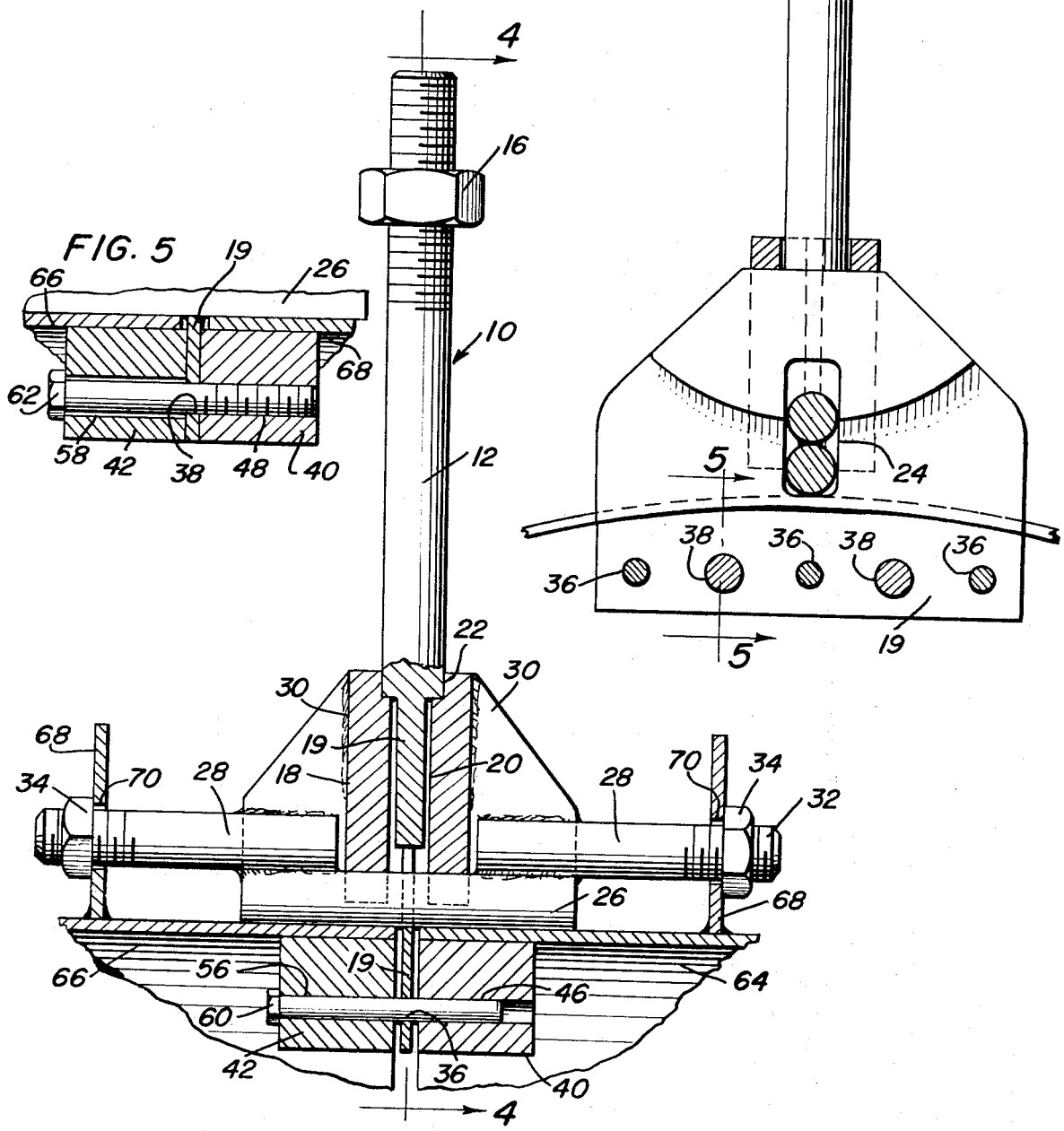

TOOL FOR ALIGNING ARTICLES

The tool of the instant invention has been designed to provide a convenient and efficient structure for properly aligning various workpieces such as pipe sections. The tool is capable of supporting the associated workpieces in aligned relation and when the tool is utilized in conjunction with adjacent pipe sections the latter may be readily welded together.

The tool, in addition to including structure whereby adjacent workpieces may be properly aligned, includes structure by which the adjacent workpieces may be drawn together so as to be only slightly spaced apart.

The main object of this invention is to provide a tool for aligning adjacent workpieces and maintaining the adjacent workpieces in stationary position relative to each other.

Another object of this invention is to provide a tool including structure by which adjacent aligned workpieces may be drawn toward each other.

Yet another object of this invention is to provide a tool specifically designed for the purpose of supporting adjacent pipe sections in aligned condition for welding of the pipe sections together.

A final object of this invention to be specifically enumerated herein is to provide a tool in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 3 is an enlarged vertical sectional view taken substantially upon a plane passing through the center of the tool and disposed on diameters of the associated pipe sections;

FIG. 4 is a fragmentary vertical sectional view taken substantially upon the plane indicated by the section line 4—4 of FIG. 3; and FIG. 5 is a fragmentary vertical sectional view taken substantially upon the plane indicated by the section line 5—5 of FIG. 4.

Figure 1:
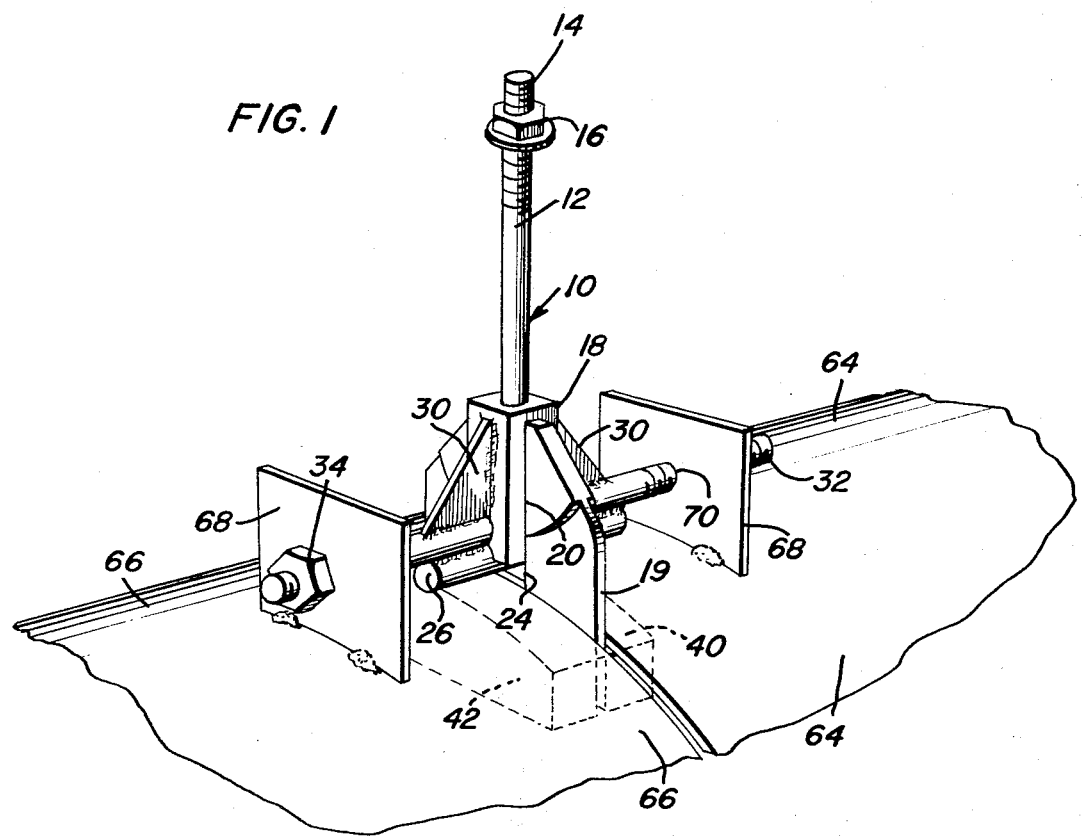
FIG. 1 is a perspective view of a pair of adjacent pipe sections with the tool of the instant invention operatively associated therewith maintaining the pipe sections in aligned condition and against axial separation relative to each other.

Referring now more specifically to the drawings, the numeral 10 generally designates the tool of the instant invention. The tool 10 includes an elongated shank 12 threaded at one end as at 14 and a thrust nut 16 is threaded on the threaded end 14. The opposite end of the shank 12 has an end marginal portion of a blade 19 secured thereto and the threaded end of the shank 12 is telescoped through a sleeve 18 provided with a diametric support slot 20 which extends almost the full length of the sleeve. The blade 19 is slidingly received in the slot 20 and the end of the shank from which the blade 19 is supported seats in a counterbore 22 formed in the unslotted end of the sleeve. The blade 19 has a guide slot 24 formed therein which generally parallels the shank 12 and the slotted end of the sleeve 18 is provided with a transverse abutment 26 which is slidingly received through the slot 24. A pair of axially spaced and aligned shanks 28 parallel and are secured to the opposite ends of the transverse abutment member 26 and are disposed on the side of the latter adjacent the unslotted end of the sleeve 18. The adjacent ends of the shanks 28 are braced by gusset plates 30 secured between the sleeve 18 and shanks 28 and the remote ends of the shanks 28 are threaded as at 32 and have thrust nuts 34 threadedly engaged therewith.

The end marginal portion of the blade 19 remote from the threaded end of the shank 12 has two sets of bores 36 formed therethrough and a pair of abutment blocks 40 and 42 are disposed on opposite sides of the blade 19. The abutment block 40 has bores 46 and 48 formed therethrough registrable with the corresponding bores 36 and 38 and the bores 48 are threaded. The abutment block 42 has bores 56 and 58 formed therethrough registrable with the bores 36 and 38 and guide pins 60 have their shank portions passed through the bores 36, 46 and 56 while threaded bolts 62 have their shank portions passed through the bores 38, 48 and 58, the shank portions of the bolts 62 being threaded in the bores 48.

Figure 2:
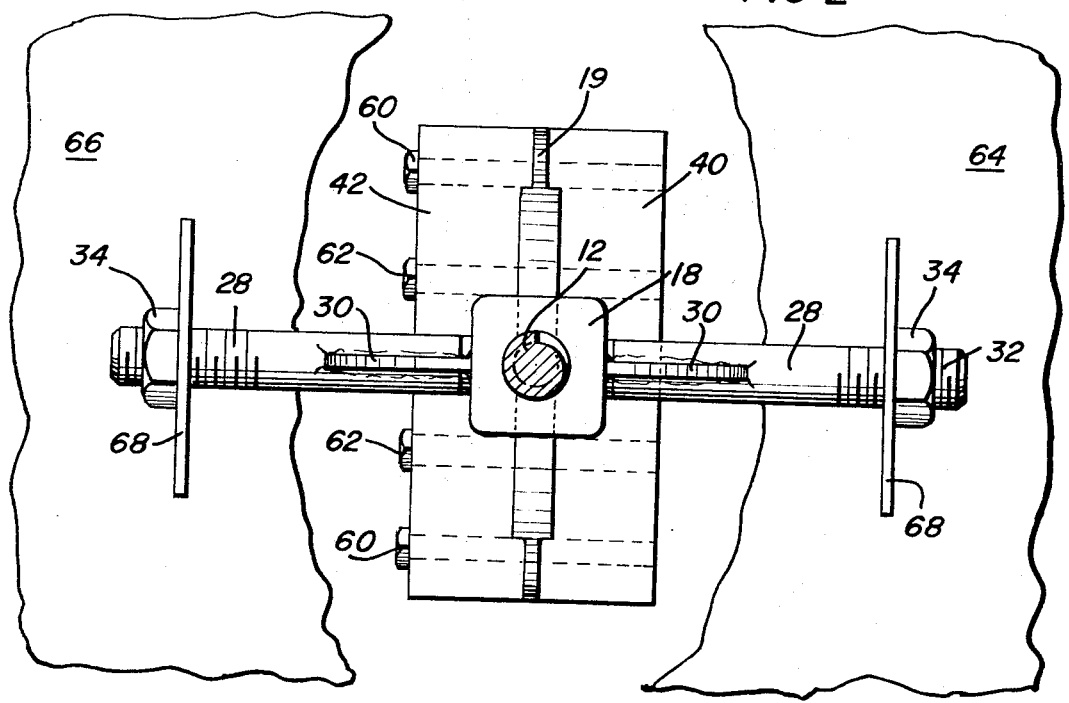
FIG. 2 is an enlarged top plan view of the assemblage illustrated in FIG. 1 with the upper portions of the adjacent pipe sections being broken away.

When the tool is to be used to align adjacent ends of a pair of pipe sections such as the pipe sections 64 and 66 illustrated in FIGS. 1, 2 and 3, the abutment members 40 and 42 are applied to the extended marginal edge portion of the blade 19 in the manner illustrated in FIG. 3 of the drawings inside of the pipe sections 64 and 66. Then, with the tool 10 positioned as illustrated in FIG. 3 of the drawings, an abutment sleeve may be disposed on the shank 12 between the sleeve 18 and the thrust nut 16 and the thrust nut 16 may be threaded downwardly on the shank 12 so as to pull the abutment members 40 and 42 toward the abutment member 26.

If it is desired to pull the pipe sections 66 and 64 together, a pair of abutment plates 68 having bores 70 formed therethrough are tack-welded to the outer surfaces of the pipe sections 64 and 66 with the remote ends of the shanks 28 projecting through the bores 70. Then, the thrust nuts 34 are threaded toward each other in order to draw the pipe sections 64 and 66 together.

In addition to using an abutment sleeve on the shank 12 between the nut 16 and the sleeve 18, a hollow core hydraulic jack may be disposed on the shank between the nut 16 and the sleeve 18. In this manner, the shank 12 may be axially shifted relative to the sleeve by operating the hollow core hydraulic jack and without turning the nut 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A tool for aligning articles, said tool including a body blade having first and opposite end marginal portions, a pair of abutment blocks supported from said first end marginal portion, projecting outwardly from opposite sides of said blade and including abutment surfaces extending generally parallel to said first end marginal portion and facing toward said opposite end marginal portion, said opposite end marginal portion including an elongated shank anchored thereto at one end and projecting edgewise outwardly from said opposite end marginal portion, a carriage sleeve telescoped over said shank and including a slotted end in which said blade is slidingly received, a guide slot formed in said blade and extending along a line extending between said first and opposite end marginal portions, the slotted end of said sleeve including abutment means projecting outwardly from opposite sides thereof on opposite sides of said guide slot, the other end of said shank and said sleeve including abutment means for operative connection with thrust developing means to lengthwise advance said shank relative to said sleeve in the direction in which said shank end remote from the slotted end of the sleeve faces, said abutment means including endwise outwardly projecting shank extensions displaced toward the end of the sleeve remote from the slotted end thereof, the remote ends of said extensions being threaded and having threaded thrust members threadingly engaged therewith.

2. The combination of claim 1 including a pair of gusset plates secured between said shank extensions and the corresponding sides of said sleeve.

3. A tool for aligning articles, said tool including a body blade having first and opposite end marginal portions, a pair of abutment blocks supported from said first end marginal portion, projecting outwardly from opposite sides of said blade and including abutment surfaces extending generally parallel to said first end marginal portion and facing toward said opposite end marginal portion, said opposite end marginal portion including an elongated shank anchored thereto at one end and projecting edgewise outwardly from said opposite end marginal portion, a carriage sleeve telescoped over said shank and including a slotted end in which said blade is slidingly received, a guide slot formed in said blade and extending along a line extending between said first and opposite end marginal portions, the slotted end of said sleeve including abutment means projecting outwardly from opposite sides thereof on opposite sides of said guide slot, the other end of said shank and said sleeve including abutment means for operative connection with thrust developing means to lengthwise advance said shank relative to said sleeve in the direction in which said shank end remote from the slotted end of the sleeve faces, the surfaces of said abutment means opposing said abutment blocks are convex semi-cylindrical extending in a direction generally normal to the centerline of said sleeve.

4. A tool for aligning articles, said tool including a body blade having first and opposite end marginal portions, a pair of abutment blocks supported from said first end marginal portion, projecting outwardly from opposite sides of said blade and including abutment surfaces extending generally parallel to said first end marginal portion and facing toward said opposite end marginal portion, said opposite end marginal portion including an elongated shank anchored thereto at one end and projecting edgewise outwardly from said opposite end marginal portion, a carriage sleeve telescoped over said shank and including a slotted end in which said blade is slidingly received, a guide slot formed in said blade and extending along a line extending between said first and opposite end marginal portions, the slotted end of said sleeve including abutment means projecting outwardly from opposite sides thereof on opposite sides of said guide slot, the other end of said shank and said sleeve including abutment means for operative connection with thrust developing means to lengthwise advance said shank relative to said sleeve in the direction in which said shank end remote from the slotted end of the sleeve faces, the surfaces of said abutment blocks opposing the opposite ends of said abutment member being convex partial cylindrical and coextensive with each other.

5. The combination of claim 4 wherein the radii of curvature of said partial cylindrical surfaces are larger than the radii of curvature of said semicylindrical surfaces.

6. The combination of claim 5 wherein said abutment means includes endwise outwardly projecting shank extensions displaced toward the end of the sleeve remote from the slotted end thereof, the remote ends of said extension being threaded and having threaded thrust members threadingly engaged therewith.

7. The combination of claim 6 including a pair of gusset plates secured between said shank extensions and the corresponding sides of said sleeve.

8. In combination, a body sleeve, a shank slidingly received through said sleeve, a first end of said sleeve having a transverse endwise outwardly opening central support slot formed therein, the corresponding first end of said shank including a diametric blade slidingly received in said slot, said blade having an elongated guide slot formed therein aligned with the center axis of said sleeve, said first end of said sleeve having a transverse abutment member secured thereacross bridging the slotted end of said sleeve and slidingly received in the slot formed in said blade, the opposite sides of said blade including laterally outwardly projecting abutment blocks opposing the opposite ends of said abutment member and removably supported from said blade, said shank and sleeve including abutment means for operative connection with thrust developing means to shift said shank relative to said sleeve in a direction to seat said blade in said sleeve slot, said abutment means including endwise outwwardly projecting shank extensions displaced toward the end of the sleeve remote from the slotted end thereof, the remote ends of said extensions being threaded and having threaded thrust members threadingly engaged therewith.

* * * * *